United States Patent [19]

Okada

[11] Patent Number: 5,381,395
[45] Date of Patent: Jan. 10, 1995

[54] INFORMATION DETECTION OF A PHASE-CHANGE TYPE OPTICAL RECORDING MEDIUM BY SHIFTING THE PHASE OF A REFERENCE LIGHT

[75] Inventor: Mitsuya Okada, Tokyo, Japan

[73] Assignee: NEC Corporation, Tokyo, Japan

[21] Appl. No.: 69,375

[22] Filed: Jun. 1, 1993

[30] Foreign Application Priority Data

Jun. 2, 1992 [JP] Japan .................................. 4-140816

[51] Int. Cl.⁶ .............................................. G11B 7/00
[52] U.S. Cl. .................. 369/112; 369/275.2; 369/107
[58] Field of Search ...................... 369/100, 112, 275.2, 369/44.25, 286, 288, 102, 107

[56] References Cited

U.S. PATENT DOCUMENTS

| 5,025,439 | 6/1991 | Komaki et al. | 369/100 |
| 5,084,851 | 1/1992 | Noda et al. | 369/112 |
| 5,291,470 | 3/1994 | Nishiuchi et al. | 369/100 |

FOREIGN PATENT DOCUMENTS 2-73537 3/1990 Japan .

Primary Examiner—Paul M. Dzierzynski
Assistant Examiner—Kim-Kwok Chu
Attorney, Agent, or Firm—Sughrue, Mion, Zinn, Macpeak & Seas

[57] ABSTRACT

A signal information recorded on a recording layer formed on a phase-change type optical disk is reproduced as a phase change. Laser light emitted from a laser light source is collimated to a reference light by a lens. The reference light is divided by a beam splitter into a first reference light and a second reference light. The first reference light is directed through a condenser lens to the recording layer of the optical disk. A reflection light from the recording layer is directed through the beam splitter and a second condenser lens to an optical detector. The second reference light is passed through a phase difference plate, a reflection mirror, the phase difference plate, the beam splitter and then through the second condenser lens to the optical detector as a phase shifted reference light. At an input end of the optical detector, the reflection light and the phase-shifted reference light interfere with each other and the signal information having substantially no phase jitter is obtained at an output of the optical detector.

6 Claims, 2 Drawing Sheets

INFORMATION DETECTION OF A PHASE-CHANGE TYPE OPTICAL RECORDING MEDIUM BY SHIFTING THE PHASE OF A REFERENCE LIGHT

BACKGROUND OF THE INVENTION

The present invention relates to a technique for reading information from an optical disk and, particularly, a technique for reading information from a phase-change type optical disk on which the information is recorded by utilizing reversible phase-change to be caused by irradiation of the optical disk with light.

It has been known that a phase-change type optical disk has an inherent advantage of easy rewriting without the necessity of an external magnetic field and, therefore, it has been expected that the phase-change type optical disk will become major in the field of write/erase optical disks in the near future.

In the phase-change type optical disk, information is recorded by irradiating a recording film on the disk with a laser light spot having power corresponding to the information, and locally heat the recording film to thereby change phase of the film material between a crystalline state and an amorphous state. Information is reproduced by irradiating the film with laser light of low power to read the difference in reflectance between a crystalline state portion and an amorphous state portion of the recording film as a difference in intensity between reflected light from the crystalline state portion and from the amorphous state portion.

For example, in a phase-change type optical disk utilizing a crystalline recording film whose crystallization time is relatively long, information is recorded on a portion of the recording film formed on the optical disk by irradiating it with laser light to locally increase temperature of the recording film portion to a value higher than the melting point thereof while rotating the optical disk, and by rapidly cooling the melted portion to bring it to an amorphous state.

In erasing the information, the amorphized portion of the recording film is crystallized by heating it to a temperature in a crystallizable temperature range from its crystallization temperature to its melting point and holding the temperature for a time sufficient to crystallize the recording film portion. In this case, an erasing beam to be used has an ellipsoidal cross section whose major axis is in parallel to a moving direction of laser beam on the optical disk.

In a case where a new data is to be written while erasing any previously recorded data, that is, in a case of the so-called pseudo overwriting, the recording film is irradiated with a recording beam having a circular cross section immediately following the erasing beam.

On the other hand, in an optical disk utilizing an information recording film of a material capable of being crystallized at high speed, a single laser beam collimated to a circular cross section is used. In a conventional method, a recording film on an optical disk is crystallized or amorphized by switching laser light between two levels. When the recording film is irradiated with a laser light whose power is large enough to increase its temperature up to its melting point, a portion of the film which is irradiated therewith is amorphized by cooling, while it is crystallized by irradiating it with a laser light whose power is large enough to increase its temperature to a value higher than the crystallization temperature and lower than the melting point and cooling.

The recording film of the phase-change type optical disk is formed of chalcogenide such as GeSbTe, InSbTe, InSe, InTe, AsTeGe, TeOx—GeSn, TeSeSn, SbSeBi or BiSeGe, etc., by using a suitable film forming technique such as resistive heating vapor deposition, electron beam vapor deposition or sputtering, etc. The recording film immediately after formation is in a sort of amorphous state and, therefore, the amorphous state recording film is pre-treated to crystallize it as a whole so that an information recording can be done by locally changing the phase of the recording film to amorphous state by laser beam irradiation.

As mentioned above, in the phase-change type optical disk, data is recorded as an amorphous recording mark on the crystalline recording film. A conventional method of reading the data thus recorded utilizes a difference in reflectance between the amorphous recording mark and the crystalline state portion surrounding the latter and, thus, the thickness of the recording film on the optical disk medium is selected such that the difference in reflectance becomes large enough to clearly distinguish the amorphous portion and the crystalline portion of the recording film.

However, when the difference in reflectance between the crystalline portion and the amorphous portion is made large, thermal absorptance becomes different between these two portions. Thus the power of laser light required for changing from a crystalline state to an amorphous state is different from that required for changing the previous amorphous state to new amorphous state. In such a case, when the overwriting is performed by using a signal beam a variation in the length of the recording mark is produced. Since such variation may cause jitter in a reproduced signal, the quality of the reproduced signal is degraded.

In order to reduce such jitter contained in the reproduced signal, Japanese Patent Application Laid-open No. Hei 2-73537, published on Mar. 13, 1990, proposes to reduce the difference in reflectance between an amorphous portion and a crystalline portion of a recording layer. In such case, however, the level of signal reproduced by using the conventional technique which utilizes the difference in reflectance becomes too small, resulting in a new problem in that the S/N ratio of the reproduced signal is lowered.

SUMMARY OF THE INVENTION

An object of the present invention is, therefore, to solve the above mentioned defect of a conventional phase-change type optical disk device.

Another object of the present invention is to provide a phase-change type optical disk reproducing system that is capable of improving jitter characteristics of a signal reproduced from a phase-change type optical disk using a simple optical system.

A further object of the present invention is to provide a novel phase-change type optical disk reproducing system that makes high density recording possible.

According to the present invention, there is provided an optical disk device which comprises:
   a phase-change type optical disk medium for recording a recording data by changing phase of a portion of a recording film formed on the recording medium to either crystalline state or amorphous state;
   a light source for emitting a reference light;

a beam splitter for dividing the reference light from the light source into a first reference light and a second reference light, supplying the first reference light to the phase-change type optical disk medium and passing the first reference light reflected by the phase-change type optical disk medium, the first reference light reflected by the phase-change type optical disc medium being phase-shifted by data recorded thereon;

phase shifting means for shifting phase of the second reference light and outputting it as a phase shifted reference light; and optical detector means for receiving the first reference light reflected by the phase-change type optical disk medium and passed through the beam splitter and the phase-shifted reference light and outputting an electric signal corresponding to the recorded data.

DETAILED DESCRIPTION OF THE PREFERRED EMBODIMENTS

A preferred embodiment of the present invention will be described with reference to FIGS. 1A to 1D which show waveforms useful in explaining the principle of the present invention and FIG. 2 which shows a construction of an optical head utilizing the present invention.

First, the principle of the present invention will be described with reference to FIGS. 1A to 1D.

Figure 1A:
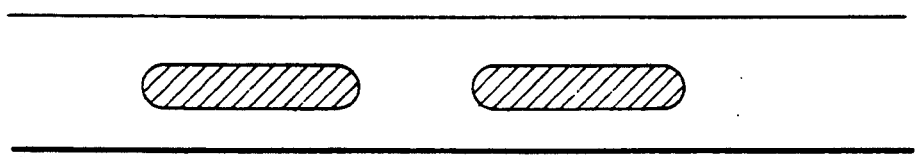
FIG. 1A illustrates a recording track on a recording layer, to or from which an optical head according to the present invention writes or reads information.

FIG. 1A illustrates a recording track on a crystalline recording layer, to or from which an optical head according to the present invention writes or reads information. Hatched portions in FIG. 1A indicate amorphized portions in the crystalline recording layer. The crystalline recording layer of an optical disk system with which the optical head of the present invention is used is designed such that reflectance of the amorphized portion is substantially equal to that of the crystalline layer, while phase-change of light reflected from the amorphous layer is different from that reflected from the crystalline layer.

Figure 1B:
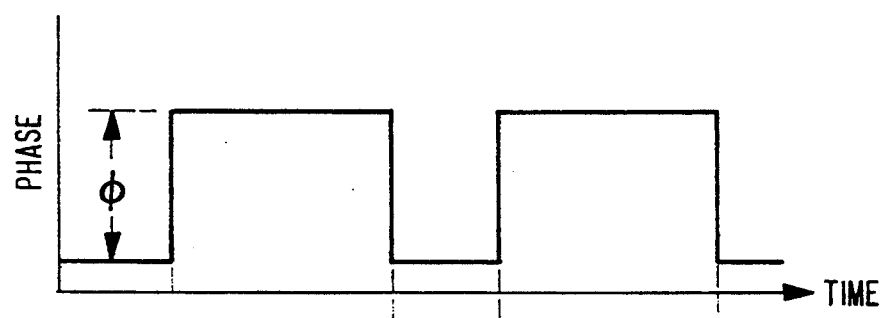
FIG. 1B shows change of phase of light reflected from an optical disk with respect to a reference light.

Fig. 1B shows a phase-change of reflected light, that is, reproduced laser light, with respect to a reference laser light. As shown in FIG. 1B, the reflected light from the amorphous layer is different in phase from that reflected from the crystalline layer, by $\phi$.

Figure 1C:
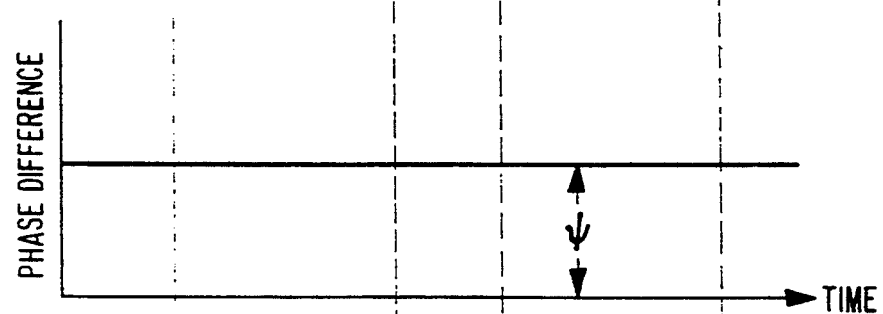
FIG. 1C shows phase of a reference light phase shifted with respect to the reference light.
Figure 1D:
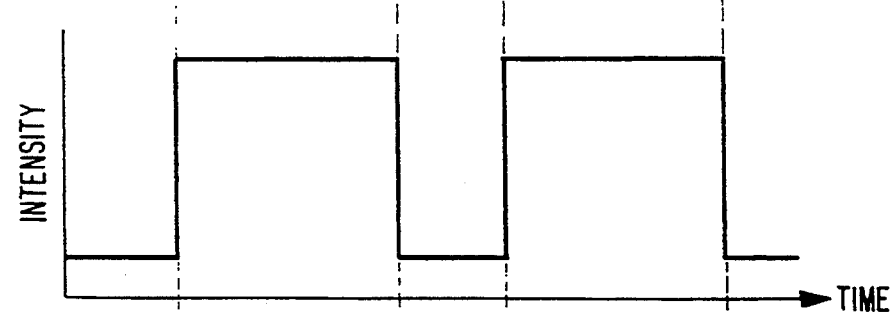
FIG. 1D shows a waveform of an output of an optical detector.

As will be described later, the reflected light, that is, the reproduced light, and a phase shifted reference laser light, which is a phase-shifted light of the reference laser light, are received by an optical detector provided within the optical head of the present invention. That is, as shown in FIG. 1C, the phase-shifted reference laser light whose phase is different from that of the light reflected from the crystalline layer by 4 is received, together with the reproduced laser light, by the optical detector. The phase shifted reference laser light and the reproduced light interfere with each other in the optical detecter and a resulting variation of light intensity such as shown in FIG. 1D appears at an output of the optical detector. More specifically, when an amplitude of the reproduced laser light is equal to that of the phase shifted reference laser light and the phase difference $\psi$ is set to 180°, the output level of the optical detector is substantially lowered due to interference of the reproduced laser light and the phase shifted reference laser light when the light reflected from the crystalline layer is received.

On the other hand, when the reproduced light inputted to the optical detector is light reflected from the amorphous layer, the output level of the optical detector is determined by the phase difference $\phi$, and has a higher value than when the reproduced light inputted to the optical detector is light reflected from the crystalline layer.

Figure 2:
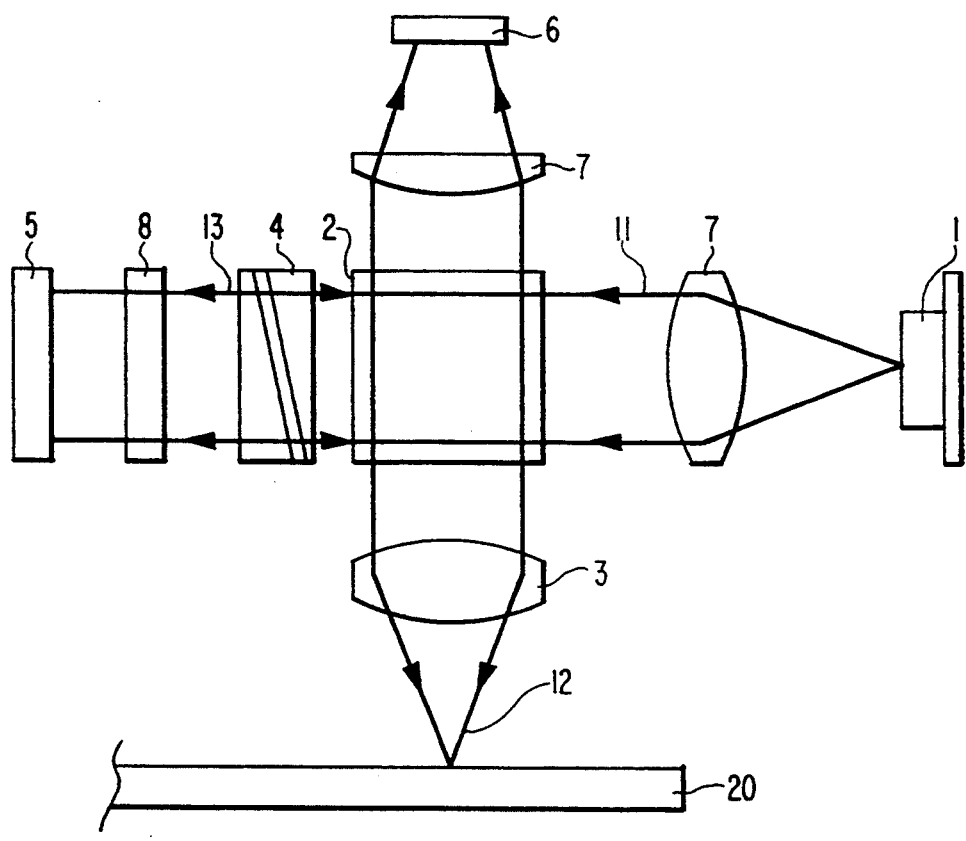
FIG. 2 shows a construction of an optical head according to the present invention.

FIG. 2 shows a construction of an embodiment of the optical head according to the present invention which is applied to the phase-change type optical disk reproducing system. The embodiment is constituted mainly with a laser light source 1, a beam splitter 2, a condenser lens 3, a phase difference plate 4, a reflection mirror 5 and an optical detector 6.

A laser light emitted from the laser light source 1 is collimated by a collimator lens 7 to a parallel beam 11. The beam splitter 2 splits the parallel beam 11 into two reference lights. One of the two reference lights is condensed by the condenser lens 3 to a first reference light 12 which is focused onto a phase-change type optical disk 20. Light reflected from the optical disk 20 passes through the condenser lens 3, the beam splitter 2, and a second condenser lens 7, to the optical detector 6.

The other reference light passes through the phase difference plate 4 as a second reference light 13 and through an attenuator 8, is reflected by the reflection mirror 5, passes through the attenuator 8 and the phase difference plate 4 again and through the beam splitter 2, and is directed to the optical detector 6 through the second condenser lens 7 as phase-shifted reference laser light.

In one embodiment, the laser light source 1 comprises a semiconductor laser emitting a laser light having, for example, wavelength of 830 nm and output power of 40 mW. The condenser lens 3 has numerical aperture of 0.55 and is mounted on a servo actuator which is not shown. The phase difference plate 4 is of the variable phase difference type having a similar construction to that of the well known Babinet compensator or Soleil compensator. The attenuator 8 disposed between the phase difference plate 4 and the reflection mirror 5 is provided to equalize the intensity of the phase shifted reference laser light at the optical detector to that of the reflected light.

Then, an optical disk was prepared such that the difference in reflectance between the crystalline portion and the amorphous portion is small, and the difference in optical phase therebetween is large, for laser light having a wavelength of 830 nm. That is, on a polycarbonate substrate having pre-grooving having diameter of 130 mm and thickness of 1.2 mm, a first protective film of a mixture of ZnS and $SiO_2$, a recording film of GeSbTe, a second protective film of the same mixture as that of the first protective film, and a reflection film of Al were continuously formed in that order by magnetron-sputtering. The first protective film was 150 nm thick, the recording film was 10 nm thick, the second protective film was 60 nm thick, and the reflection film was 50 nm thick. In this optical disk, the difference in reflectance at wavelength of 830 run was 2% and phase difference was 170°.

Overwriting was performed with respect to the above mentioned optical disk by using the optical head shown in FIG. 2 and characteristics of a reproduced signal were evaluated.

That is, a signal of 8.4 MHz (Duty 50%) was recorded on a circular track formed on the optical disk after initialization and having radius of 30 mm, by irradiating it with a recording laser light having power of 13 mW, while rotating the optical disk at 3600 r.p.m., and, then, a signal of 2.2 MHz (Duty 50%) was overwritten on the same track by irradiating it with an erasing laser beam having power of 7 mW, similarly.

Then, the phase difference plate 4 was regulated such that the phase difference between the reproducing laser light and the reference laser light in a portion of the track in which there was no signal recorded becomes 180°, and power levels of these laser lights were made equal by using the attenuator 8. A signal reproduced under these conditions included substantially no phase jitter caused by overwriting.

As described hereinbefore, according to the present invention, phase information recorded on an optical disk can be efficiently reproduced by using a simple optical system. According to the present invention, even a small phase change can be detected by selecting interference condition, that is, selecting phase condition of the reference laser light, resulting in improved freedom of disk design. Further, the reproducing system of the present invention is particularly suitable for a mark-edge recording system in which information is recorded in the edge portion of a recording mark, allowing high density recording.

What is claimed is:

1. An optical disk device comprising:
   a phase-change type optical disk medium including a recording film for recording a recording data by changing phase of a portion of said recording film to one of crystalline state and amorphous state;
   a light source for emitting a reference light;
   a beam splitter for dividing the reference light from said light source into a first reference light and a second reference light, for supplying the first reference light to said phase-change type optical disk medium, and for passing the first reference light reflected by said phase-change type optical disk medium to an optical detector, the first reference light reflected by said phase-change type optical disc medium being phase-shifted by data recorded thereon;
   phase shifting means for shifting phase of the second reference light and outputting it as a phase shifted reference light to the optical detector; and
   said optical detector for receiving the first reference light reflected by said phase-change type optical disk medium and passed through said beam splitter, and the phase shifted reference light, and outputting an electric signal corresponding to the recorded data.

2. The optical disk device claimed in claim 1, wherein said recording film of said phase-change type optical disk medium has a thickness selected such that reflectance of said recording film in crystalline state and reflectance of said recording film in amorphous state for the reference light are substantially the same and phase of the reflection light from said recording film in crystalline state and the reflection light from said recording film in amorphous state are different.

3. The optical disk device claimed in claim 1, wherein said phase shifting means comprises:
   a phase difference plate for phase-shifting the second reference light, outputting the phase shifted second reference light as a third reference light, phase-shifting a fourth reference light and outputting the phase shifted fourth reference light as the phase shifted reference light; and
   a reflection plate for reflecting the third reference light and directing the fourth reference light to said phase difference plate.

4. The optical disk device claimed in claim 3, wherein phase difference between the second reference light and the phase shifted reference light is 180°.

5. The optical disk device claimed in claim 4, further comprising an attenuator provided between said phase difference plate and said reflection plate.

6. An optical head for writing in and reading out a recording data on a recording film of a phase-change type optical disk medium for recording the recording data by changing phase of said recording film to one of crystalline state and amorphous state correspondingly to the recording data, said recording film having a thickness selected such that reflectance of said recording film in crystalline state and reflectance of said recording film in amorphous state for the reference light are substantially the same and phase of the reflection light from said recording film in crystalline state and the reflection light from said recording film in amorphous state are different, said optical head comprising:
   a light source for emitting the reference light;
   a beam splitter for dividing the reference light from said light source into a first reference light and a second reference light, for supplying the first reference light to said phase-change type optical disk medium, and for passing the first reference light reflected by said phase-change type optical disk medium to an optical detector, the first reference light reflected by said phase-change type optical disc medium being phase-shifted by data recorded thereon;
   phase shifting means for shifting phase of the second reference light and outputting it to the optical detector as a phase shifted reference light; and
   said optical detector means for receiving the first reference light reflected by said phase-change type optical disk medium and passed through said beam splitter, and the phase shifted reference light, and outputting an electric signal corresponding to the recorded data.

* * * * *

UNITED STATES PATENT AND TRADEMARK OFFICE
CERTIFICATE OF CORRECTION

PATENT NO.   : 5,381,395
DATED        : January 10, 1995
INVENTOR(S)  : Mitsuya Okada It is certified that error(s) appears in the above-identified patent and that said Letters Patent is hereby corrected as shown below:

Column 3, Line 67, delete "4" and insert --Ψ--.

Signed and Sealed this

Twenty-second Day of August, 1995

Attest:

BRUCE LEHMAN

*Attesting Officer*        *Commissioner of Patents and Trademarks*